United States Patent
Jacobsen et al.

(10) Patent No.: US 10,184,812 B2
(45) Date of Patent: Jan. 22, 2019

(54) SENSOR ASSEMBLY

(71) Applicant: Grundfos Holding A/S, Bjerringbro (DK)

(72) Inventors: Kjeld Winther Jacobsen, Randers (DK); John B. Jacobsen, Bjerringbro (DK); Mikkel Haugaard, Hobro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 15/533,183

(22) PCT Filed: Aug. 28, 2015

(86) PCT No.: PCT/EP2015/069748
§ 371 (c)(1),
(2) Date: Jun. 5, 2017

(87) PCT Pub. No.: WO2016/087063
PCT Pub. Date: Jun. 9, 2016

(65) Prior Publication Data
US 2017/0328746 A1 Nov. 16, 2017

(30) Foreign Application Priority Data
Dec. 3, 2014 (EP) .................................. 14196094

(51) Int. Cl.
*G01D 11/00* (2006.01)
*G01D 11/24* (2006.01)
*G12B 9/04* (2006.01)

(52) U.S. Cl.
CPC ............. *G01D 11/245* (2013.01); *G12B 9/04* (2013.01)

(58) Field of Classification Search
CPC ................................. G01D 11/245; G12B 9/04
USPC ............................................................. 73/855
See application file for complete search history.

(56) References Cited

U.S. PATENT DOCUMENTS

| 5,139,345 A | 8/1992 | Schaefer et al. |
| 5,835,027 A * | 11/1998 | Tyburski ................... G08G 1/02 340/933 |
| 5,975,842 A | 11/1999 | Jensen et al. |
| 6,251,344 B1 | 6/2001 | Goldstein |
| 7,010,984 B2 | 3/2006 | Krog et al. |
| 7,997,132 B2 | 8/2011 | Ross, Jr. et al. |
| 2004/0095502 A1* | 5/2004 | Losehand ............... H01L 24/97 348/340 |
| 2013/0071290 A1 | 3/2013 | Goldstein et al. |
| 2014/0020446 A1 | 1/2014 | Yonezu et al. |

FOREIGN PATENT DOCUMENTS

| CN | 102261960 A | 11/2011 |
| DE | 197 00 965 C1 | 6/1998 |
| DE | 10 2013 200 775 A1 | 7/2014 |

(Continued)

*Primary Examiner* — Max Noori
(74) *Attorney, Agent, or Firm* — McGlew and Tuttle, P.C.

(57) ABSTRACT

A sensor arrangement includes at least one sensor (7) as well as a housing (1) constructed of at least two plastic injection molded parts (2, 3), and a sensor electronics which are located on the circuit board (5) and which is secured by this housing. At least one absorption body (4) is provided within the housing (1) and is designed as a plastic injection molded part and serves for absorbing fluid which could get into the housing by diffusion.

21 Claims, 5 Drawing Sheets

(56) References Cited

FOREIGN PATENT DOCUMENTS

| | | |
|---|---|---|
| DE | 20 2014 103 822 U1 | 10/2014 |
| EP | 2 083 250 A1 | 7/2009 |
| EP | 2093162 A1 | 8/2009 |
| EP | 2 626 567 A1 | 8/2013 |
| JP | H06304474 A | 11/1994 |
| SU | 281673 A1 | 4/1974 |
| WO | 2007/120898 A2 | 10/2007 |
| WO | 2014106740 A9 | 7/2014 |

* cited by examiner

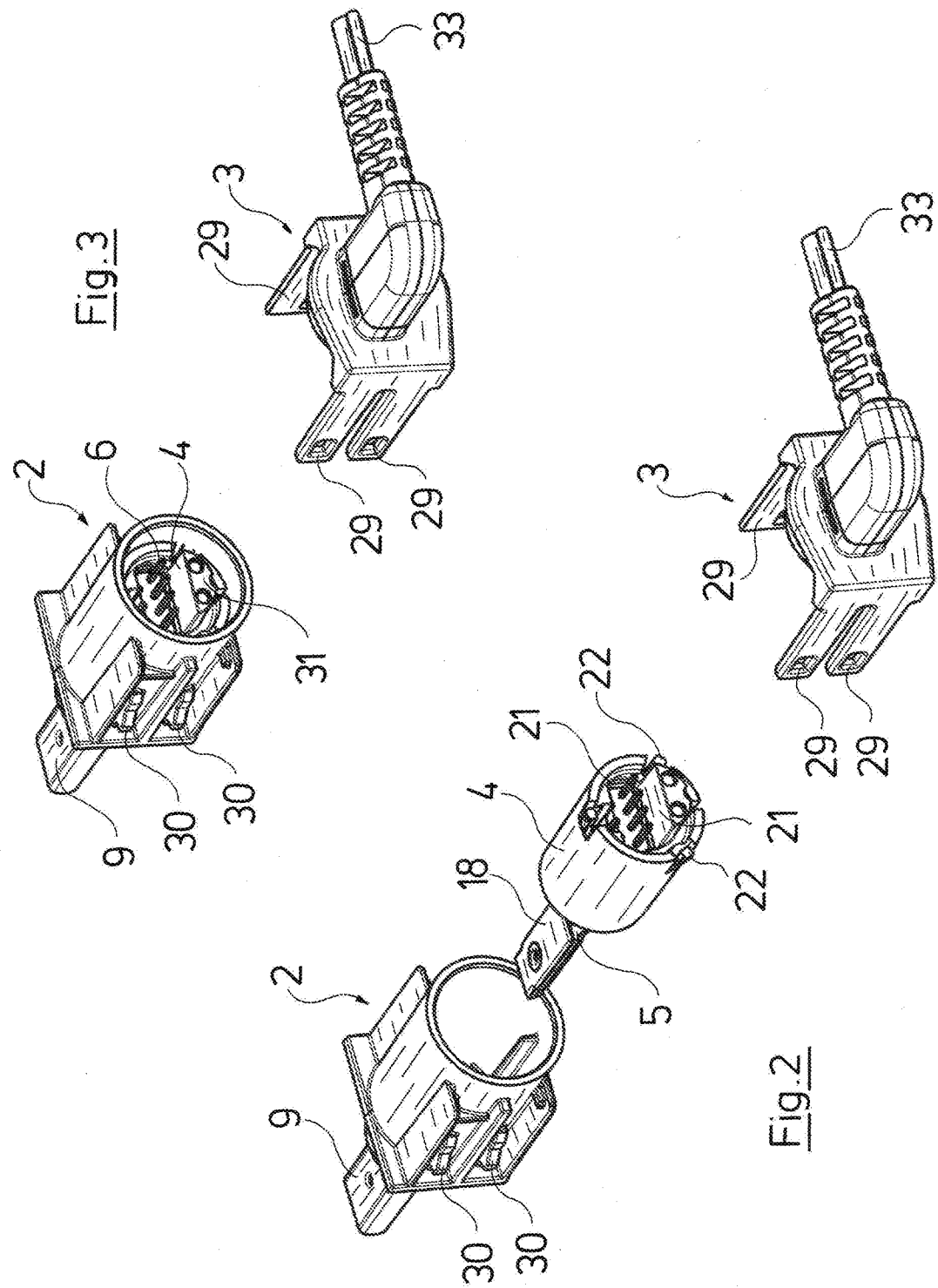

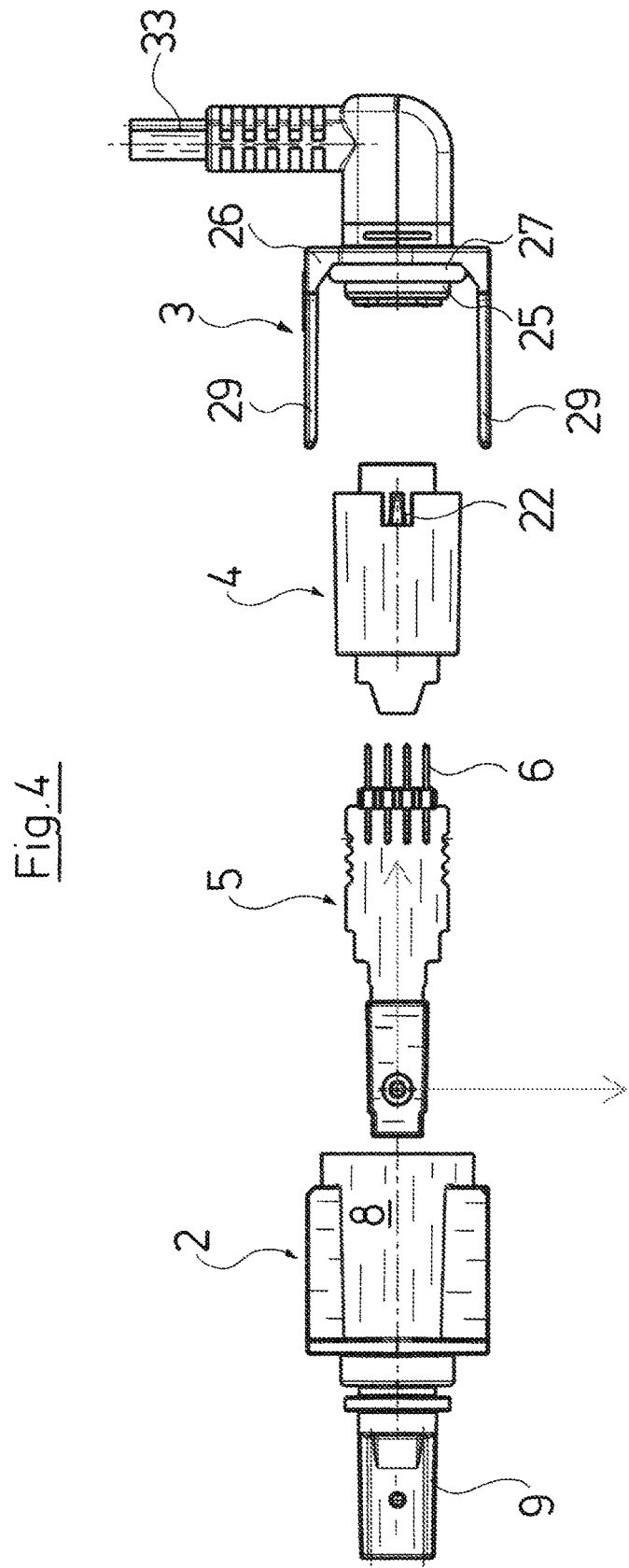

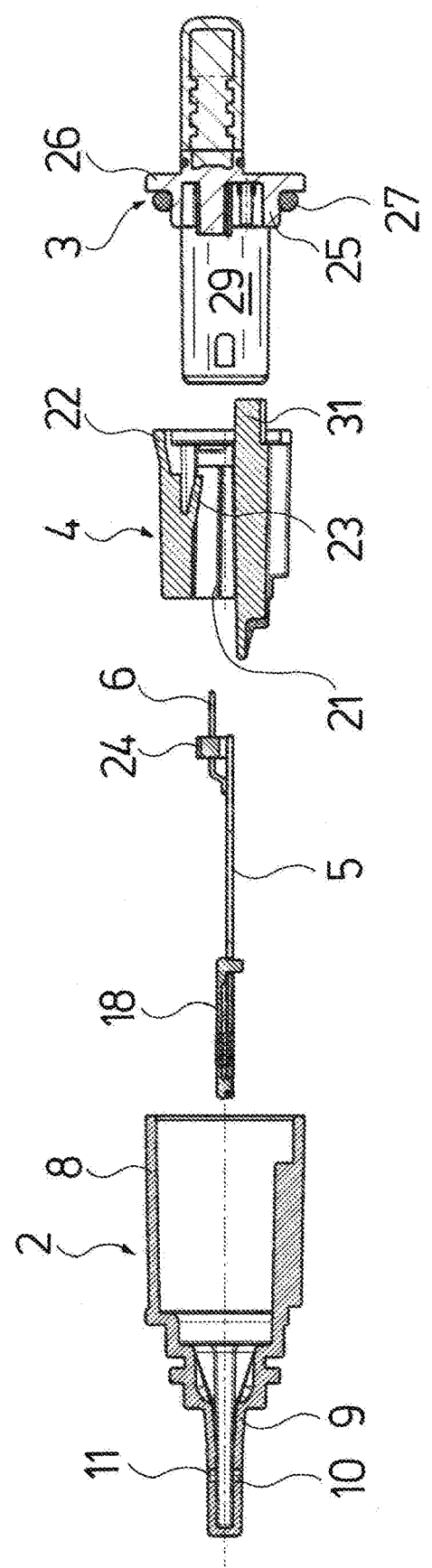

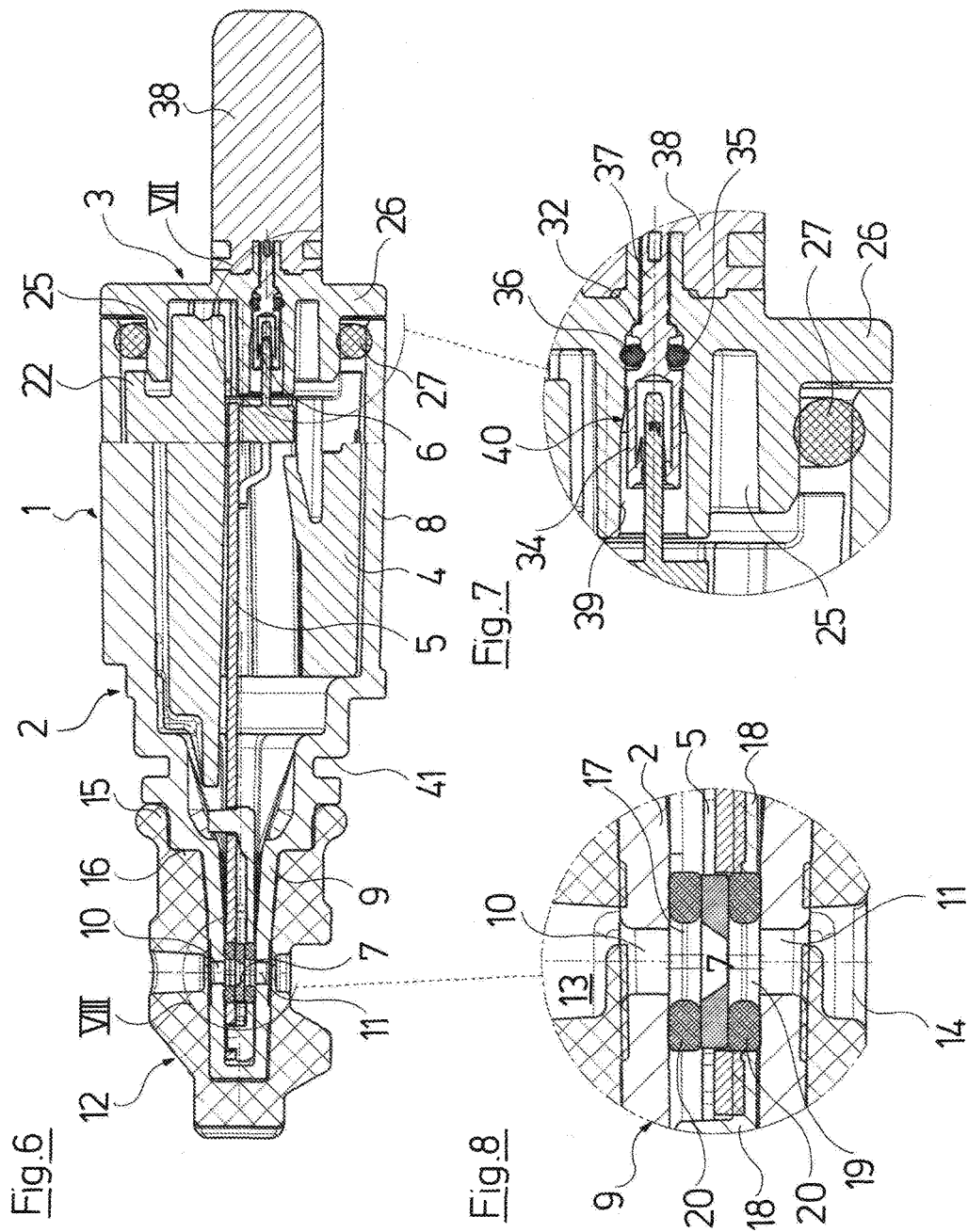

SENSOR ASSEMBLY

CROSS REFERENCE TO RELATED APPLICATIONS

This application is a United States National Phase Application of International Application PCT/EP2015/069748 filed Aug. 28, 2015, and claims the benefit of priority under 35 U.S.C. § 119 of European Application 14196094.8, filed Dec. 3, 2014, the entire contents of which are incorporated herein by reference.

FIELD OF THE INVENTION

The invention relates to a sensor arrangement with at least one sensor, with a housing constructed of at least one plastic injection molded part, with sensor electronics which are located in the housing and with at least one absorption body, which is arranged within the housing and which is for receiving and binding moisture.

BACKGROUND OF THE INVENTION

Such sensor arrangements are counted as belonging to the state of the art and comprise one or more sensors as well as a housing constructed of one or more plastic injection molded parts. At least a part of the sensor electronics is arranged within the housing, wherein an absorption means which is to absorb and bind the fluid penetrating into the housing is provided for the protection of the electronics from penetrating moisture. The penetration of such moisture or humidity, if at all, can only be prevented with an enormous amount of technical effort, since the plastics applied for the manufacture of the housing are typically not diffusion-tight and let through moisture, even if only to a limited extent, also in the region of the seals, be it between the housing parts or between the sensor and the housing or in the region of the cable feed-though.

Such sensor arrangement is known for example from EP 2 083 250 A1. Hereby, it is the case of a flowmeter which comprises a pot-like housing with a transparent cover or lid and a display arranged therebelow with sensor electronics. The actual sensor with this design is not directly connected to the channel running though the pot-like housing part, but is arranged on the outer side in the form of an ultrasound transducer. Even if the sensor itself here is not directly in contact with the fluid flowing through the channel, moisture can diffuse through the housing wall itself. Moisture can also penetrate into the housing via the seal between the cover and the housing, even if merely in the smallest of quantities. Two different plastics are built in the region of the cover for example, of which the one has a comparatively high diffusion sealedness and the other a high strength, in order to keep such an entry of moisture or humidity as low as possible. Finally, a drying agent (desiccant) is provided within the housing, in order to bind any moisture penetrating into the housing, in order to protect the sensitive sensor electronics from this. Silica gel or calcium chloride is provided here as a desiccant. Such desiccants are counted as belonging to the state of the art and are particularly to be found in packaging. A problem thereby is the fact that on the one hand a sufficient quantity of such a desiccant is to be provided in the housing, and on the other hand that it is ensured that this neither mechanically nor chemically has a negative influence on the adjacent parts.

This problem is amplified with sensor arrangements with a comparatively small housing, with which the sensor itself is in contact with the fluid, as is the case for example with pressure sensors or differential pressure sensors or temperature sensors (EP 2 626 567 A1).

SUMMARY OF THE INVENTION

Against this background, it is an object of the invention, to improve a sensor arrangement of the known type, to the extent that on the one hand fluid penetrating into the housing can be bound in an as large possible quantity and that on the other hand absorption means for binding the fluid are arranged within the housing in an as defined as possible manner.

A sensor in the context of the present invention is to be understood as the part of the sensor arrangement, via which the variable to be measured is detected, thus the actual electronic and/or mechanical sensor element whose change is detected and whose signal is actively or passively processed by way of sensor electronics. Such a sensor can be given for example by a thermo-element, by a strain gauge or by other known sensor elements.

The sensor arrangement according to the invention comprises one or more sensors and it comprises a housing which is constructed of one or more plastic injection molded parts and which receives sensor electronics processing and/or preparing the sensor signal. Absorption means in the form of an absorption body are provided within the housing, for absorbing and for binding fluid, typically moisture in the form of water. Moisture in the context of the invention however can also be a different fluid, e.g. alcohol or petrol, depending on the fluid environment in which the sensor arrangement is located. It is to be understood that the absorption means are suitably adapted for binding this fluid. According to the invention, the absorption means are formed by one or more absorption bodies which are each designed as a plastic injection molded part.

The basic concept of the present invention is to provide an absorption body for absorbing the moisture located within the sensor housing, said absorption body being designed as a plastic injection molded part and thus on the one hand being able to be manufactured inexpensively in large-scale manufacture and on the other hand being able to be adapted with regard to its shape in an as optimal as possible manner to the free space formed within the sensor housing. Due to the fact that the absorption body has a durable, plastic shape, this can be designed such that it takes up the remaining free space as completely as possible, but on the other hand has an adequate distance to the sensor electronics or their electronic components, which are located in the housing. The absorption bodies according to the invention can moreover fulfil further tasks, for example simplify the assembly of the components, by way of it functioning quasi as a holder during the assembly.

Advantageously, the housing of the sensor arrangement is constructed of at least two housing parts which are designed as plastic injection molded parts, wherein the absorption body is advantageously manufactured with one of the housing parts with the multi-component injection molding method. This design has the advantage that the absorption body is designed as one piece with a housing part and thus does not need to be handled separately on assembly.

It is particularly advantageous to seal off both housing parts to one another by way of an O-ring. Such O-rings are standard components which are inexpensively available and ensure a high sealedness. It is advantageous to seal off all housing parts to one another in each case via O-rings, if the housing is constructed of more than two housing parts.

A particularly advantageous sensor arrangement results when the housing comprises a housing part which is tubular at least in sections and a cover which terminates this at one end. This cover is then advantageously connected to the other housing part amid the integration of an O-ring. Thereby, the tubular section in the region, in which the seal is integrated, is advantageously, but not necessarily circular. The O-ring can also follow an oval or other housing contour, which for example can be given or advantageous with regard to the installation situation of the sensor arrangement in a device.

If an electrical lead (conductor) is to be led through the housing, which is the case with cable-connected sensor arrangements, then at least one electrical lead is sealingly led through one housing part, wherein the feed-through is preferably effected through the cover, wherein according to one advantageous further development of the invention, the sealing between the housing part and the lead is formed by an O-ring. The application of O-rings is also particularly advantageous in this region, since on the one hand they are inexpensive in manufacture, simple in assembly and highly effective with regard to their sealing effect.

Thereby, it has been found to be particularly advantageous, to form the lead feed-through in the housing part by a recess which has an outwardly conically tapering section, in which the O-ring comes to bear, said O-ring being arranged on the lead passing through the recess. Thereby, the lead preferably comprises a peripheral groove, in order to hold the O-ring in its designated position and to ensure a simple assembly, by way of the O-ring firstly being put onto the lead in the region of the groove, and the lead with the O-ring located thereon subsequently being mounted into the recess. A guiding of the lead on assembly is ensured due to the conicity of the recess, so that the components quasi automatically get into the designated position on insertion.

The sealing of the lead with respect to the housing part is advantageous effected by an O-ring. The lead according to a an advantageous further development of the invention, at its side remote from the housing is electrically conductively connected to a lead, wherein this lead connection is advantageously coated with an electrically insulating shrink sleeve and then peripherally injected with plastic, in order to ensure a reliable electrical connection. If several leads are arranged here, which is mostly the case, then it is to be understood that these are each coated with a shrink sleeve after completion of the electrical connection, and then are commonly peripherally injected with plastic. The electric connection is advantageously effected by way of soldering, but however can also be effected by way of welding or by way of a clamping connection. Thereby, it is advantageously the case that firstly the leads with the O-rings attached thereon are arranged in the respective recesses in the cover or, as the case maybe, in an other housing part, whereupon the electrical connections are created, the shrink sleeves attached and finally the thus formed lead connection is peripherally injected with plastic, in order to thus be fixedly and releasably connected to the cover or to the respective housing part.

It is advantageous with regard to assembly technology as well as for reasons of stability and sealedness, if the cover is designed in a plug-like manner and comprises a cover part engaging over the face side of the tubular housing, said cover part terminating with this housing part and comprising a shouldered, plug-like cover part which engages into the tubular housing part. An O-ring is arranged between the shouldered cover part and the inner side of the tubular housing part, for sealing the two housing parts.

According to an advantageous further development of the invention, the end of the tubular housing part which is remote from the cover is formed out into a tip, in which the sensor is arranged. Thus, the sensor is arranged in the tip at one end of the tubular housing part, and the cover comprising the electrical lead feed-throughs is arranged to the other end, with such an arrangement.

The sensor electronics are advantageously at least partly arranged on a circuit board which longitudinally passes through the tubular housing part, at one end carries the sensor or sensors and at the other end is connected to the leads led through the housing cover and carries the respective lead contacts.

According to a further development of the invention, the absorption body is adapted to the inner contour of the housing and is arranged at a distance to the housing wall by way of spacers, in order for the space formed within the sensor housing to be utilized by the absorption body as much as possible. These spacers on the one hand prevent the absorption body bearing on the housing wall, so that a certain circulation and thus also distribution of moisture is possible around the absorption body. On the other hand, the spacers are important so that a certain free space remains between the absorption body and the housing wall, said free space being required by the absorption body, in order to be able to accordingly expand when absorbing humidity.

The spacers are advantageously part of the absorption body and preferably are formed by spring tongues which project laterally out of the absorption body and which in the installed condition are supported on the housing wall and thus hold the absorption body within the housing at a distance to the housing wall.

Advantageously, the absorption body comprises a central recess which is essentially rectangular in cross section and which is provided for receiving the circuit board. Thereby, the recess is designed such that the circuit board longitudinally passes through the absorption body, but is distanced to this.

So as to ensure an unambiguous positional assignment between the tubular part of the housing and the absorption body, positive-fit means are advantageously provided between these components, said positive fit means unambiguously determining their arrangement to one another. Moreover or alternatively, positive-fit means are provided between the housing cover and the absorption body and which unambiguously determine their arrangement to one another. Such a design permits an assembly of the components to one another only in the desired predefined position, and incorrect assemblies are reliably ruled out by way of this.

The absorption body can also advantageously delimit the space for receiving the O-ring between the tubular housing part and the cover, at one side, so that practically no further measures are necessary on the housing components for receiving the O-ring, as the design described below in more detail particularly shows.

Advantageously, a projecting spring tongue which engages into a recess or into a projection on the circuit board and which firmly holds the circuit board in particular within the absorption body is advantageously provided in the central recess of the absorption body, in order to connect the absorption body and the circuit board to one another. This arrangement in particular is advantageous with regard to a simplified assembly, since the circuit board can firstly be arranged in the absorption body and then this part which is unified via the spring tongue, as quasi one part can be joined into the sensor housing.

If the sensor is to be in quasi direct contact with the fluid, then it is advantageous if the housing in the region of the sensor comprises an opening, and the sensor is sealed with respect to the housing by way of an O-ring in the region of the opening. The O-ring in this region too forms a simple seal which is easy to assemble and is inexpensive and stable over the longer term.

Two openings are provided in the housing, in the region of the sensor at opposite sides of the sensor, if the sensor is to be designed as a differential pressure sensor, such as with the application in circulation pumps, in particular heating circulation pumps, but also on other fields, wherein advantageously each of these openings is sealed with respect to the sensor by way of an O-ring.

It is particularly advantageous if all seals of the sensor housing are formed by O-rings, since no special seals are then necessary and one can apply inexpensive seal elements which are simple to assemble. Such O-rings can just as well be applied as a radial seal and/or axial seal, without an adaptation of the seal itself being necessary. It is only the sealing seat which is to be designed accordingly. O-rings are inexpensive in manufacture and in particular have a very high sealedness with the static loading which is of relevance here.

An absorption body in the context of the invention is to be understood as a body which can permanently bind water and/or moisture (humidity). Thereby, according to the invention, an absorption body is applied, whose plastic can absorb at least 0.5 mass percent of water and/or at least 0.2 mass percent of moisture (humidity), preferably more than 5 mass percent of water and/or more that 2 mass percent of moisture (humidity). The greater the absorption capacity for liquid and/or moisture (humidity), the more favorable it is. However, it is important that the water or moisture remain bound in the absorption body. A multitude of plastics which are predestined for this are known. Thus advantageously polyoxymethylene, polyethersulphone, acrynitril-butadiene-styrene or preferably polyamide can be applied here. A plastic of the public limited company BASF, Germany and which is specified under the trademark Ultramid® A3W for example has been found to be suitable for this, and it is hereby the case of a polyamide. This plastic can absorb 8 to 9 mass percent of water (at 23° C.) or 2.5 to 3.1 mass percent of moisture (humidity) (at 23° C. and 50% relative air humidity). Hostaform® C9021 of Ticona GmbH Germany is specified here as a polyoxymethylene. By way of example, the plastic offered by the public limited company BASF Germany under the trademark Ultrason® E 2010 G6 SW 15038 is cited as a polyethersulphone. A plastic offered by the Saudi Arabian company Sabic under the trademark Cycolac® Resin S702S is mentioned as an ABS plastic. The above mentioned plastics are all suitable for injection molding and have the necessary water-binding or moisture-binding (humidity-binding) characteristics.

The invention is hereinafter explained in more detail by way of one embodiment example which is represented in the drawing. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a view of the sensor arrangement according to FIG. 1, after a first assembly step;

FIG. 3 is a view of the sensor arrangement according to FIG. 1 according to a second assembly step;

FIG. 4 is a view of the components of the sensor arrangement according to FIG. 1;

FIG. 5 is a longitudinal sectional view through the components according to FIG. 4;

FIG. 6 is a longitudinal sectional view through the assembled sensor arrangement;

FIG. 7 is an enlarged representation of the detail VII of FIG. 6; and

FIG. 8 is an enlarged representation of the detail VIII of FIG. 6.

DESCRIPTION OF THE PREFERRED EMBODIMENTS

Figure 1:
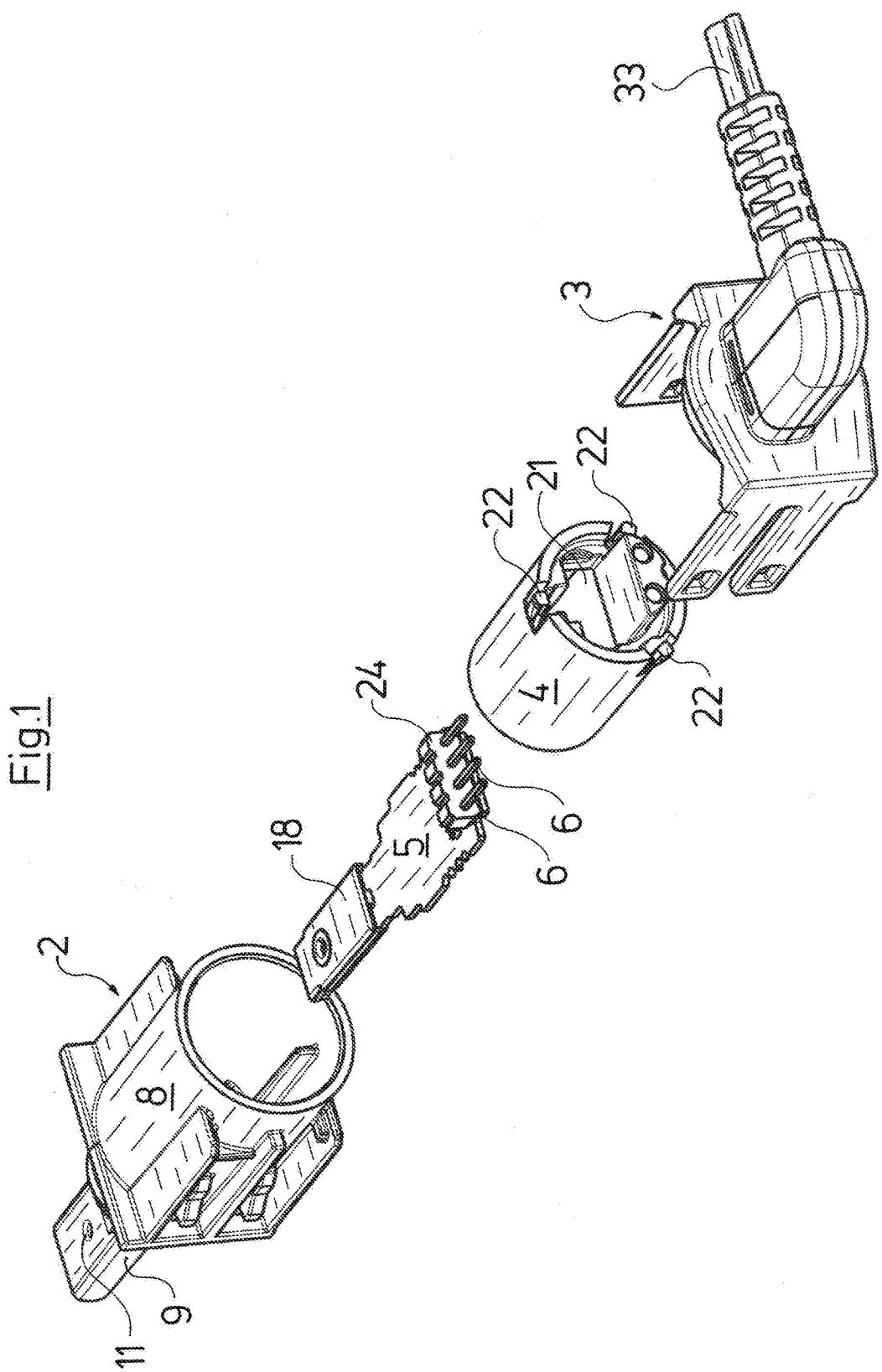
FIG. 1 is a greatly simplified exploded representation of a sensor arrangement according to the invention.

Referring to the drawings, the sensor arrangement which is represented in the figures comprises a housing 1, which is formed from a tubular housing part 2 and a cover 3. An absorption body 4 as well as a circuit board 5 are arranged in this housing 1. The circuit board 5 carries the sensor electronics and is provided at one end with electrical contacts 6 for the electrical connection and at the other end with the actual sensor 7, with which it is the case of a differential pressure sensor. The housings 2 and 3 are designed as plastic injection molded parts, just as the absorption body 4 which is provided for absorbing fluid, here water. The absorption body 4 binds the water or humidity located within the housing 1, in order to thus protect the electronic components arranged on the circuit board 5 from moisture.

The housing part 2 comprises a tubular section 8 which has an essentially hollow-cylindrical shape and at one axial end (at the right end in the FIGS. 4, 5 and 6) is designed for receiving the cover 3 and at the other axial end is formed into a tip 9 which is likewise formed as a hollow body and is provided with a recess 10 and 11 in each case on two flat sides which are away from one another by 180 degrees. The sensor 7 is seated here and this as a differential sensor can be impinged from two sides and is connected to the respective fluid, whose pressure is to be detected.

The represented sensor arrangement is envisaged for integration into a suitable recess in a pump housing, as is counted as belonging to the state of the art for example from EP 2 626 567 A1. The tip 9 is seated within a soft-elastic sealing sleeve 12 which surrounds the tip and comprises recesses 13 and 14 which are aligned or flush with the recesses 10 and 11 and which lead to corresponding channels in the pump housing. The sleeve is shaped out into a sealing ring 15 for sealing, and this sealing ring connects axially to the sealing sleeve 12 and is arranged on a shoulder 16 of the tubular housing part 2 between the tubular section 8 and the tip 9.

A spacer body 18 which consists of a soft-elastic material, projects beyond the circuit board 5 at its tip-side end and fills out the free space between the tip-side end of the circuit board 5 and the cavity within the housing tip 9 and thus fixes the axial position of the circuit board 5 is provided so that the sensor 7 arranged in the region of a recess 17 in the circuit board is arranged in the designated position within the housing tip 9, said position being represented in FIG. 8. This spacer body 18 is supported at the inside within the housing part 2 roughly in the region, in which the seal 15 come to bears at the outside, and in a manner aligned to the sensor 7 and the recess 11 comprises a recess 19 which, as is the case with the recess 17 in the circuit board, peripherally supports an O-ring 20 which at one side is supported by the sensor 7 and at the other side by a wall of the housing part 2. These O-rings 20 which surround the sensor on both sides seal this with respect to the housing part 2, so that the fluid fed via the recesses 10 and 11 in the housing tip 9, although reaching the sensor 7, cannot get into the housing 1.

The circuit board 5 in the region of the tubular section 8 is received in a recess 21 which passes through the essentially cylinder-shaped absorption body 4. The absorption body 4 is essentially adapted to the inner contour of the tubular housing part 2 in this region. It comprises three projections 22 which are uniformly distributed over the periphery, and are in the form of tongues which form spacers and project obliquely to the rear, thus in the direction of the connection-side end, as well as radial outwards, and ensure that the absorption body 4 bears at a radial distance within the tubular housing part 2. The circuit board 5 at the non-furnished side of the circuit board 5 which lies at the top in FIG. 6 lies with a small distance within the recess 21, and at the other side with a greater distance, in order to form a free space for the electronic components which are located on the circuit board 5. A spring tongue 23 which projects obliquely inwards and to the connection-side end is formed within the recess 21, in the absorption body 4, and this spring tongue ensures that the absorption body 4 and the circuit board 5 remain connected to one another, thus can be handled quasi as one component, after the connection of these, as is represented in FIG. 2. For this, the spring tongue 23 engages behind a projection 24 on the circuit board 5, said projection here serving for leading out the electrical contacts.

The cover 3 is designed in a plug-like manner and comprises an annular section 25 which projects inwards into the tubular section 8 of the housing part 2 and is surrounded by this at a distance (in the assembled condition see FIG. 6). A flange 26 projects radially beyond this annular section 25 and terminates the tubular section 8 at the face side and bears on this. The inner side of this flange 26 as well as the outer side of the annular section 25 form the cover-side part of a seat for an O-ring 27 which is delimited radially to the outside by the annular section of the housing part 2 and axially by the projections 22 of the absorption body 4. The O-ring 27 seals the housing parts 2 and 3 to one another. The components are connected by detent tongues 29 which connect laterally onto the flange 26, run in the direction of the housing part 2 and on pushing together the housing parts 2 and 3 lock behind projections 30 on the outer side of the housing part 2 and thus fixedly connect the components to one another. The housing parts 2 and 3 can thus be permanently connected to one another by way of simply sticking them together, as is particularly evident from FIG. 3.

The absorption body 4 at its end which is directed to the cover, apart from the contacts 6 comprises a projection 31 which, when the circuit board 5 is integrated into the recess 21 in the absorption body 4, is received in a suitably formed pocket-hole on the inner side of the cover 3 in order to ensure that the absorption body 4 can only be integrated into the cover 3 in its designated position. A joining-together of these components is only possible in the designated position, since the projection 31 in the absorption body 4 as well as the respective pocket-hole-like recess in the cover 3 are arranged and designed asymmetrically with respect to the longitudinal middle axis.

The sensor arrangement is cable-connected in the represented embodiment, i.e. the contacts 6 are connected to leads of a cable 23 via electrical leads 32 which are led through the cover 3, wherein the sensor arrangement is signal-connected and electrically connected via this cable.

A wireless electrical supply can also be envisaged, for example inductively. The signal connection can then be effected via radio (WLAN, Bluetooth or likewise). The electrical leads 32 are of metal and each comprise a sleeve-like part 34 which points into the housing inside and which is provided for receiving a contact 6 and for the electrical connection to this. The sleeve-like part 34 of each lead 32 is designed cylindrically on the outer side and is provided with a peripheral groove 35 which is envisaged for receiving an O-ring 36. In the area of the groove 35 and beyond the groove 35 the lead is solid, has a circular cross section and is continued in a pin-like manner. This pin-like part 37 passes through the cover 3 and is continued on the outer side where the respective lead of the cable 33 is connected to this part 37 by way of soldering. The part 37 of the electrical lead 32 as well as the soldered lead of the cable 33 is electrically insulated to the outside by a shrink sleeve, on the other side of the cover 3. All leads are then peripherally injected with plastic in a manner such that this plastic part forming a pull relief 38 for the cable 33 is injected on the cover 3 with a positive fit amid the inclusion of all leads.

Cylindrically stepped recesses 39 are provided within the cover 3 parallel to the longitudinal axis, for receiving the electrical leads 32, and these recesses comprise an outwardly conically tapering section 40 and each sealingly receive an electrical lead 32 amid the integration of the O-ring 36 lying in the groove 35. The electrical lead 32 is inserted into the recess 39 from the inner side of the cover, wherein the conically tapering section serves for leading the lead 32 with the O-ring 36 into the designated position, in which the lead 32 is held axially outwards with a positive fit by the stepped recess, and the O-ring 36 bears between the recess 39 and the lead 32 in a sealing manner.

The plastic injection molded part forming the cover 3 is equipped with the leads 32 from the side which faces the housing interior, in the recesses 39, by way of these leads 32 provided with an O-ring 36 being axially inserted into the respective recesses 39 to such an extent that they bear on the respective step within the recess 39. Then the leads of the cable 33 are soldered on and the shrink sleeves which were previously pulled over the lead ends are shrunk on by way of the effected of heat, whereupon the pull relief 38 is peripherally injected and thus the cover 3 is fixedly and unreleasably connected to the cable 33 and comprises the electrical connections to the cable. The circuit board 5 which is provided with the spacer body 18 and is equipped with the O-rings 20 is then inserted into the recess 21 of the absorption body 3, and specifically with the contacts 6 in front, until the spring tongue 23 springs back behind the projection 24 and with this connects the circuit board 5 and the absorption body 4 to one another.

These connected components, as are represented in FIG. 2, are then inserted into the housing part 2 until the end of the spacer body 8 and thus also the end of the circuit board 5 are located within the tip 9 of the housing part 2 in their designated position, in which the O-rings 20 seal off the sensor 7 with respect to the housing part 2 and are in each case impinged by pressure via the recesses 10 and 11 (FIG. 3).

The housing parts 3 and 4 are still yet to be connected to one another by way of sticking together, wherein it is ensured by way of the projection 31 that the connection is effected such that the contacts 6 come into engagement in the sleeve-like parts of the electrical leads 32 which are envisaged for this, and the cover 6 is fixedly and sealingly connected to the housing part 2 amid the integration of the O-ring 27. The connection is secured by the detent tongues 29 which then engage behind the projections 30 on the housing part 2 and thus hold the sensor arrangement in the designated assembled position, so that the housing 1 with the circuit board 5 arranged therein is sealed to the outside. Thereby, the absorption body 4 is arranged at a distance to the circuit board 5 and to the housing wall, so that this can expand and thus also receive moisture when absorbing fluid which diffuses through the housing or can get into this in another manner.

All sealings of the sensor arrangement according to the invention are formed by O-rings, which is particularly advantageous since these are inexpensive in manufacture, simple in assembly and have a greater static sealing effect also over the long term. Moreover, the O-ring arrangement permits a simple exchange of the seals. The thus formed sensor arrangement then amid the integration of a sealing sleeve 12 is stuck into the recess envisaged for this, in the pump housing and is secured in this position via a peripheral groove 41 on the outer side of the housing part 2 by way of a suitable clip.

While specific embodiments of the invention have been shown and described in detail to illustrate the application of the principles of the invention, it will be understood that the invention may be embodied otherwise without departing from such principles.

The invention claimed is:

1. A sensor arrangement comprising:
   at least one sensor;
   a housing constructed of at least one plastic injection molded part;
   sensor electronics located in the housing; and
   at least one absorption body arranged within the housing for receiving and binding moisture, wherein the absorption body is a plastic injection molded component.

2. A sensor arrangement according to claim 1, wherein the housing is constructed of at least two plastic injection molded housing parts, and the absorption body is manufactured with a housing part with the multi-component injection molding method, the housing comprising a sealed housing interior space, the sensor electronics and the absorption body being arranged in the sealed housing interior space.

3. A sensor arrangement according to claim 2, further comprising an O-ring wherein the two housing parts are sealed to one another by the O-ring.

4. A sensor arrangement according to claim 1, wherein the at least one plastic injection molded part is a housing part and the housing comprises the housing part which is tubular at least in sections and a cover which terminates the housing part at one end, said housing part and said cover being connected to one another amid the integration of an O-ring, the at least one sensor being in contact with a fluid to be measured, wherein the absorbent unit is located in an interior of the housing such that the absorbent unit is free of contact with the fluid to be measured.

5. A sensor arrangement according to claim 4, further comprising at least one electrical lead sealingly led, through the cover, and the sealing between the housing part and the lead is formed by another O-ring.

6. A sensor arrangement according to claim 4, wherein a lead feed-through in the cover is formed by a recess which has an outwardly conically tapering section, in which the another O-ring comes to bear, said another O-ring being arranged on the lead passing through the recess, in a peripheral groove of the lead, one end portion of the absorbent unit being located adjacent to at least a portion of the cover.

7. A sensor arrangement according to claim 4, wherein the at least one electrical lead which is sealingly led through the cover, at a side thereof, which is remote from the housing and is electrical conductively connected to a lead, is coated with an electrically insulating shrink sleeve and then peripherally injected with plastic.

8. A sensor arrangement according to claim 4, wherein the cover is designed as a plug, with an encompassing cover part that terminates a face side of the tubular housing part and with a shouldered cover part that engages into the tubular housing part, wherein the O-ring is arranged between the shouldered cover part and the inner side of the tubular housing part.

9. A sensor arrangement according to claim 4, wherein an end of the tubular housing part, which is remote from the cover, is shaped into a tip, in which the sensor is arranged.

10. A sensor arrangement according to claim 1, wherein a circuit board is provided, which carries the sensor electronics and longitudinally passes through the tubular housing part, and at whose one end the sensor is arranged and at whose other end the leads led through the housing cover are arranged, wherein another end of the circuit board is located adjacent to absorbent unit.

11. A sensor arrangement according to claim 1, wherein the absorption body is adapted to the inner contour of the housing and is arranged at a distance to a housing wall by way of spacers.

12. A sensor arrangement according to claim 11, wherein the spacers form part of the absorption body and are designed as spring tongues laterally projecting out of the absorption body.

13. A sensor arrangement according to claim 10, wherein the circuit board longitudinally passes through the absorption body and is distanced therefrom, the absorbent unit comprising an inner surface defining an absorbent unit opening, at least a portion of the circuit board being located in the absorbent unit opening.

14. A sensor arrangement according to claim 1, further comprising a positive-fit means between the tubular housing part and the absorption body to determine the arrangement of the tubular housing part and the absorption body to one another and/or a positive-fit means between the housing cover and the absorption body to unambiguously define the arrangement of the tubular housing part and the absorption body to one another.

15. A sensor arrangement according to claim 5, wherein the absorption body at one side delimits a space for receiving the O-ring between the tubular housing part and the cover.

16. A sensor arrangement according to claim 1, wherein the absorption body comprises a spring tongue which projects into a central recess for a circuit board, engages into a recess or a projection on the circuit board and holds the circuit board within the absorption body.

17. A sensor arrangement according to claim 1, wherein the housing in a region of the sensor comprises an opening, and the sensor is sealed with respect to the housing by way of an O-ring in a region of the opening.

18. A sensor arrangement according to claim 1, wherein the sensor is a differential pressure sensor, two openings are provided in the housing on opposite sides of the sensor, in the region of the sensor, wherein each opening is sealed with respect to the sensor by an O-ring.

19. A sensor arrangement according to claim 1, further comprising sealings, wherein all of the sealings of the sensor housing are formed by O-rings.

20. A sensor arrangement according to claim 1, wherein the absorption body consists of a plastic which can absorb at least 0.5 mass percent of water and/or at least 0.2 mass percent of moisture (humidity).

21. A sensor arrangement according to claim 1, wherein the absorption body consists of polyoxymethylene, polyethersulphone, acrynitril-butadiene- styrene or polyamide.

* * * * *